United States Patent
Choi et al.

(10) Patent No.: US 12,260,074 B2
(45) Date of Patent: Mar. 25, 2025

(54) DISPLAY DEVICE FOR ADJUSTING RECOGNITION SENSITIVITY OF SPEECH RECOGNITION STARTING WORD AND OPERATION METHOD THEREOF

(71) Applicant: LG ELECTRONICS INC., Seoul (KR)

(72) Inventors: Woojin Choi, Seoul (KR); Sunho Hwang, Seoul (KR); Sungeun Kim, Seoul (KR); Yongwoo Yoo, Seoul (KR); Moonyoung Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/024,256

(22) PCT Filed: Sep. 1, 2020

(86) PCT No.: PCT/KR2020/011729
§ 371 (c)(1),
(2) Date: Mar. 1, 2023

(87) PCT Pub. No.: WO2022/050433
PCT Pub. Date: Mar. 10, 2022

(65) Prior Publication Data
US 2023/0367461 A1    Nov. 16, 2023

(51) Int. Cl.
*G06F 3/048*      (2013.01)
*G06F 3/04842*    (2022.01)
*G10L 15/08*      (2006.01)

(52) U.S. Cl.
CPC .......... *G06F 3/04842* (2013.01); *G10L 15/08* (2013.01); *G10L 2015/088* (2013.01)

(58) Field of Classification Search
CPC ............... G06F 3/04842; G10L 15/08; G10L 2015/088
See application file for complete search history.

(56) References Cited

U.S. PATENT DOCUMENTS 9,443,527 B1 *    9/2016   Watanabe ............... G10L 15/30
10,228,903 B2 *   3/2019   Kang ..................... H04W 12/04
(Continued)

FOREIGN PATENT DOCUMENTS

EP      3654330        5/2020
KR      20160014297    2/2016
(Continued)

OTHER PUBLICATIONS

PCT International Application No. PCT/KR2020/011729, International Search Report dated May 26, 2021, 4 pages.
(Continued)

*Primary Examiner* — David Phantana-angkool
(74) *Attorney, Agent, or Firm* — LEE, HONG, DEGERMAN, KANG & WAIMEY

(57) ABSTRACT

An embodiment of the present disclosure provides a display device for adjusting recognition sensitivity of a speech recognition starting word, the display device including a display, a microphone, a memory configured to store a default starting word recognition engine that recognizes a speech recognition starting word, and a processor configured to determine a valid recognition threshold range of the default starting word recognition engine, assign recognition thresholds within the valid recognition threshold range to a predetermined number of sensitivity levels, display a sensitivity setting interface including the sensitivity levels through the display, and set a default recognition threshold of the default starting word recognition engine to a recognition threshold selected through the sensitivity setting interface.

14 Claims, 15 Drawing Sheets

(56) References Cited

U.S. PATENT DOCUMENTS

| | | | |
|---|---|---|---|
| 10,978,058 B2 | 4/2021 | Yoo et al. | |
| 11,664,024 B2* | 5/2023 | Lee | G10L 15/08 |
| | | | 704/201 |
| 11,881,213 B2* | 1/2024 | Yoon | G10L 25/51 |
| 12,087,296 B2* | 9/2024 | Kwak | G10L 15/32 |
| 2012/0316876 A1* | 12/2012 | Jang | H04N 21/42203 |
| | | | 704/E15.001 |
| 2015/0359468 A1* | 12/2015 | Bochner | A61B 5/123 |
| | | | 600/559 |
| 2016/0035350 A1 | 2/2016 | Jung et al. | |
| 2018/0374476 A1* | 12/2018 | Lee | G10L 15/22 |
| 2019/0391716 A1* | 12/2019 | Badr | G06F 3/0482 |
| 2020/0105264 A1 | 4/2020 | Jang et al. | |
| 2020/0184966 A1 | 6/2020 | Yavagal | |
| 2020/0234715 A1* | 7/2020 | Kim | G10L 15/22 |
| 2021/0089172 A1* | 3/2021 | Joo | G06F 3/0481 |
| 2021/0366477 A1* | 11/2021 | Smith | G10L 15/22 |
| 2021/0383811 A1* | 12/2021 | Goscha | G06N 3/08 |
| 2022/0293106 A1* | 9/2022 | Kim | H04N 21/2665 |
| 2022/0335954 A1* | 10/2022 | Choi | G10L 15/22 |
| 2023/0282209 A1* | 9/2023 | Kwak | G10L 15/32 |
| | | | 704/235 |
| 2023/0367461 A1* | 11/2023 | Choi | G06F 3/04842 |

FOREIGN PATENT DOCUMENTS

| | | | |
|---|---|---|---|
| KR | 20190065861 | | 6/2019 |
| KR | 102093851 | * | 3/2020 |
| KR | 20200037687 | | 4/2020 |

OTHER PUBLICATIONS

European Patent Office Application Serial No. 20952532.8, Search Report dated Apr. 3, 2024, 4 pages.

* cited by examiner

FIG. 16
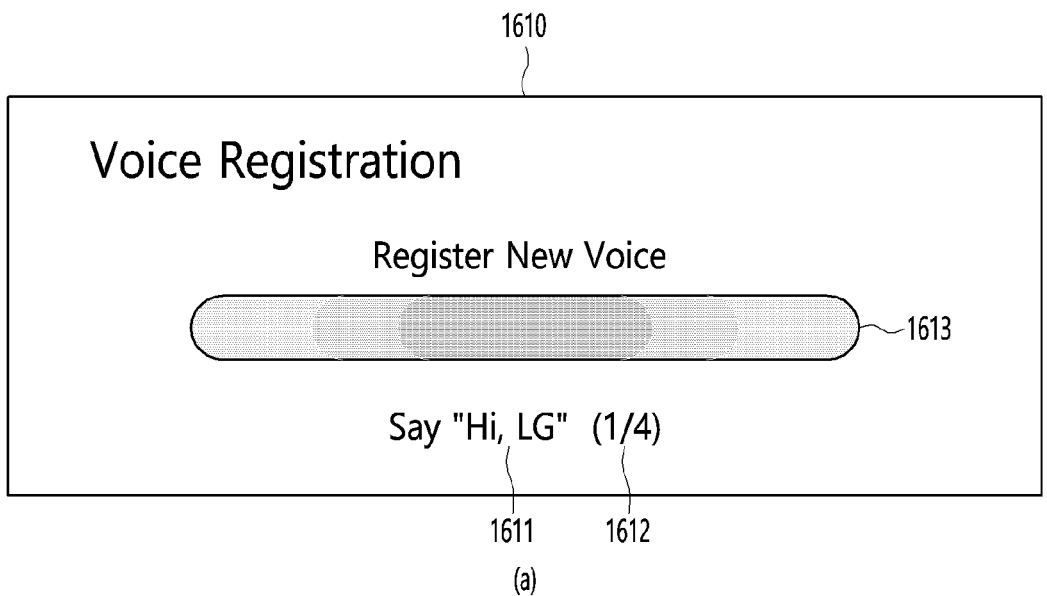
(a)
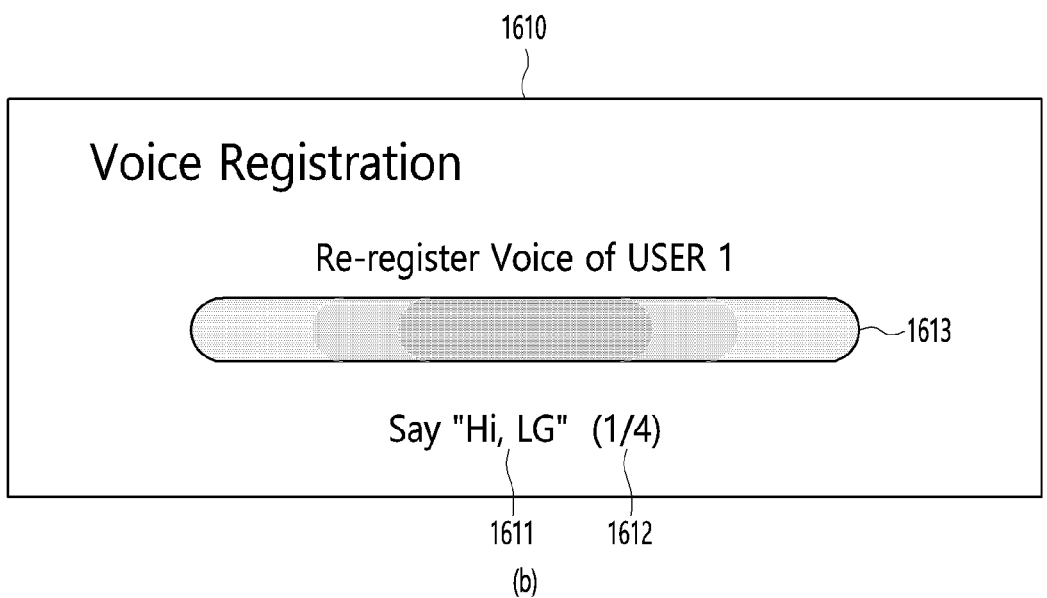
(b)

DISPLAY DEVICE FOR ADJUSTING RECOGNITION SENSITIVITY OF SPEECH RECOGNITION STARTING WORD AND OPERATION METHOD THEREOF

CROSS-REFERENCE TO RELATED APPLICATIONS

This application is the National Stage filing under 35 U.S.C. 371 of International Application No. PCT/KR2020/011729, filed on Sep. 1, 2020, the contents of which are all incorporated by reference herein in their entirety.

TECHNICAL FIELD

The present disclosure relates to a display device for adjusting a recognition sensitivity of a speech recognition starting word and an operation method thereof.

BACKGROUND ART

A display device is a device that provides visualized content using a display or a display panel. Recently, a display device is equipped with a speech recognition function so that a user can control the operation of the display device through speech. The speech recognition function is activated when a predetermined starting word is recognized, and performance of the recognition of the starting word has a great influence on the user's experience.

Not only when the user utters a starting word but the display device does not recognize the starting word, but also when the display device determines that the starting word has been input even though the user has not uttered the starting word, the user determines that the performance of the speech recognition function is low, resulting in low satisfaction with the speech recognition function. In particular, when the display device determines that the starting word has been input even though the user has not uttered the starting word, there is a major problem in that the appreciation of content through the display device is disturbed as the speech recognition function is activated.

Speech recognition performance varies depending on users due to differences in voice characteristics such as voice and pronunciation, and each user has different sensitivity or satisfaction with respect to voice recognition performance. Some users may be greatly dissatisfied in a situation in which a starting word is uttered but not recognized, and some users may be greatly dissatisfied in a situation in which a starting word is recognized even though the starting word is not uttered. If the user can adjust a recognition sensitivity of the speech recognition starting word, the satisfaction with the speech recognition function of various users can be increased.

DISCLOSURE OF INVENTION

Technical Problem

An object of the present disclosure is to provide a display device and a method for enabling a user to adjust a recognition sensitivity of a speech recognition starting word.

In addition, the present disclosure is to provide a display device and a method for registering a voice and individually adjusting a recognition sensitivity.

In addition, the present disclosure is to provide a display device and a method for recognizing a speech recognition starting word based on an adjusted recognition sensitivity.

Technical Solution

An embodiment of the present disclosure provide a display device which determines a valid recognition threshold range of a default starting word recognition engine, assigns recognition thresholds within the valid recognition threshold range to a predetermined number of sensitivity levels, displays a sensitivity setting interface including the sensitivity levels, and sets a recognition threshold of the default starting word recognition engine to a recognition threshold selected through the sensitivity setting interface, and an operation method thereof.

The display device may obtain first recognition thresholds that equally divide the valid recognition threshold range by a number of predetermined sensitivity levels, and sequentially assign the obtained first recognition thresholds to the sensitivity levels, respectively.

The display device may calibrate the first recognition thresholds according to a predetermined recognition threshold unit to generate second recognition thresholds, and sequentially assign the generated second recognition thresholds to the sensitivity levels, respectively.

The display device may determine, as the valid recognition threshold range, a range of recognition thresholds in which an amount of change in a false acceptance rate (FAR) or a false rejection rate (FRR) of the default starting word recognition engine is greater than a predetermined value compared to an amount of change in a recognition threshold of the default starting word recognition engine.

The display device may obtain first recognition thresholds that equally divide the valid recognition threshold range by a number of predetermined sensitivity levels, and sequentially assign the obtained first recognition thresholds to the sensitivity levels, respectively.

The display device may obtain speech data including a voice to be registered, and generate a starting word recognition engine corresponding to the voice to be registered by retraining the starting word recognition engine using the obtained speech data.

The display device may set a recognition threshold for the starting word recognition engine corresponding to a registered voice based on an input through the sensitivity setting interface and perform settings for starting word recognition engines for which a recognition threshold is not set, among the starting word recognition engines corresponding to the registered voices, such that the recognition threshold is set to a recognition threshold set in the default starting word recognition engine or the default recognition threshold.

The display device may generate a starting word recognition result for speech data using each starting word recognition engine, determine whether the voice of the speech data is a registered voice based on voice characteristics of the speech data, when the voice is the registered voice, determine a starting word recognition result of the starting word recognition engine corresponding to the voice as a final starting word recognition result and w the voice is not the registered voice, determine a starting word recognition result of the default starting word recognition engine as the final starting word recognition result.

Advantageous Effects

According to various embodiments of the present disclosure, it is possible to increase user satisfaction for the recognition performance of a speech recognition starting word and reduce customer service costs for the speech recognition performance.

In addition, according to various embodiments of the present disclosure, it is possible to separately apply the recognition sensitivity of the speech recognition starting word for each user even when multiple users use one display device, thereby improving the satisfaction of the various users for the recognition performance of the speech recognition starting word.

BRIEF DESCRIPTION OF DRAWINGS

FIG. 16 is a diagram illustrating a voice registration interface according to an embodiment of the present disclosure.

BEST MODE FOR CARRYING OUT THE INVENTION

Figure 1:
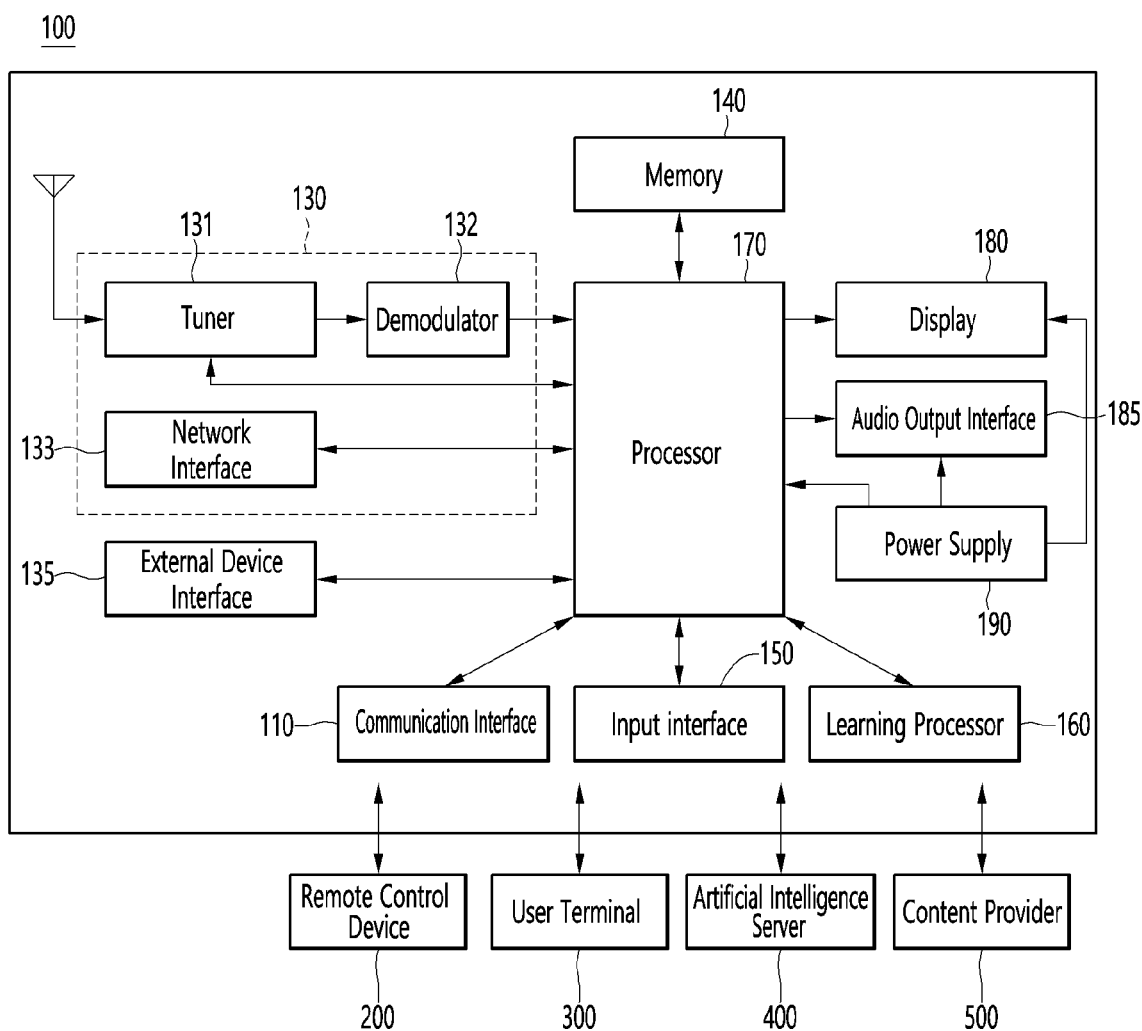
FIG. 1 is a block diagram showing a configuration of a display device according to an embodiment of the present disclosure.

Hereinafter, the embodiments disclosed herein will be described in detail with reference to the accompanying drawings, and the same or similar elements are designated with the same numeral references regardless of the numerals in the drawings and their redundant description will be omitted. The suffixes "module" and "unit or portion" for components used in the following description are merely provided only for facilitation of preparing this specification, and thus they are not granted a specific meaning or function. In addition, when it is determined that the detailed description of the related known technology may obscure the gist of embodiments disclosed herein in describing the embodiments, a detailed description thereof will be omitted. Further, the accompanying drawings are intended to facilitate understanding of the embodiments disclosed herein, and the technical spirit disclosed herein are not limited by the accompanying drawings. Therefore, the present disclosure should be construed as including all the changes, equivalents, and substitutions included in the spirit and scope of the present disclosure.

The terms coming with ordinal numbers such as 'first', 'second', or the like may be used to denote various components, but the components are not limited by the terms. The terms are used merely for the purpose to distinguish a component from the other component.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

FIG. 1 is a block diagram showing a configuration of a display device according to an embodiment of the present disclosure.

Referring to FIG. 1, the display device 100 may be connected to at least one of a remote control device 200, a user terminal 300, and an artificial intelligence server 400 or a content provider 500 to transmit/receive data or signals.

The display device 100 refers to a device capable of outputting an image including a display 180 or a display panel, and may be implemented by a stationary device or a mobile device, such as a TV, a projector, a mobile phone, a smartphone, a desktop computer, a laptop, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a digital signage, a robot, a vehicle, and the like.

The user terminal 300 may be implemented as a mobile phone, a smart phone, a tablet PC, a laptop, a wearable device, a PDA, or the like. The user terminal 300 may be simply referred to as a terminal 300.

The content provider 500 may refer to a device that provides content data corresponding to content to be output from the display device 100, and the display device 100 may receive content data from the content provider 500 and output the content.

The display device 100 may include a communication interface 110, a broadcast reception module 130, an external device interface 135, a memory 140, an input interface 150, a processor 170, a display 180, an audio output interface 185, and a power supply 190.

The communication interface 110 may perform a wired or wireless communication with an external electronic device. For example, the communication interface 110 may transmit and receive sensor information, a user input, a learning model, and a control signal to and from external devices, such as another display device. Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure.

The communication unit 110 may detect (or recognize) a wearable device capable of communication around the display device 100. Furthermore, if the detected wearable device is a device authenticated to communicate with the display device 100, the processor 170 can transmit at least part of data processed in the display device 100 to the wearable device through the communication interface 110. Therefore, a user of the wearable device may use data processed by the display device 100 through the wearable device.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The communication unit 110 may be referred to as a communication modem or a communication interface.

The broadcast reception module 130 can include a tuner 131, a demodulator 132, and a network interface 133.

The tuner 131 may select a specific broadcast channel according to a channel selection command. The tuner 131 may receive broadcast signals for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface 135 may be output through the display 180. The audio signal of the external device input through the external device interface 135 may be output through the audio output interface 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, the network interface 133 can transmit or receive data to or from a corresponding server by accessing a predetermined webpage through the network.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed. For example, the memory 140 may store input data acquired by the input interface 150, learning data, a learning model, a learning history, and the like.

The memory 140 may perform a function for temporarily storing video, audio, or data signals input from an external device interface 135 or the network interface 133, and store information on a predetermined image through a channel storage function.

The memory 140 can store an application or an application list input from the external device interface 135 or the network interface 133.

The display device 100 may play back a content file (a moving image file, a still image file, a music file, a document file, an application file, or the like) stored in the memory 140 and provide the same to the user.

The input interface 150 may acquire various kinds of data. In this case, the input interface 150 may include a camera for inputting a video signal, a microphone for receiving an audio signal, and a user input unit for receiving information from a user.

The user input interface may transfer signals input by a user to the processor 170 or transfer signals from the processor 170 to a user. For example, the user input interface may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the processor 170 to the remote control device 200.

Additionally, the user input interface 150 may transfer, to the processor 170, control signals input from local keys (not shown) such as a power key, a channel key, a volume key, and a setting value.

The learning processor 160 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

In this case, the learning processor 160 may perform AI processing together with the learning processor 440 of the AI server 400.

At this time, the learning processor 160 may include a memory integrated or implemented in the display device 100. Alternatively, the learning processor 160 may be implemented by using the memory 170, an external memory directly connected to the display device 100, or a memory held in an external device.

Image signals that are image-processed in the processor 170 can be input to the display 180 and displayed as an image corresponding to corresponding image signals. Additionally, the image signals that are image-processed in the processor 170 can be input to an external output device through an external device interface 135.

The audio signal processed by the processor 170 may be output to the audio output interface 185. Also, the audio signal processed by the processor 170 may be input to the external output device through the external device interface 135.

The processor 170 may control overall operation of the recognition device 100.

Additionally, the processor 170 can control the display device 100 by a user command or internal program input through the user input interface and download a desired application or application list into the display device 100 in access to network.

The processor 170 may output channel information selected by a user together with processed image or voice signals through the display 180 or the audio output interface 185.

Additionally, according to an external device image playback command received through the user interface, the processor 170 can output image signals or voice signals of an external device such as a camera or a camcorder, which are input through the external device interface 135, through the display 180 or the audio output interface 185.

Moreover, the processor 170 can control the display 180 to display images and control broadcast images input through the tuner 131, external input images input through the external device interface 135, images input through the network interface unit, or images stored in the memory 140 to be displayed on the display 180. In this case, an image displayed on the display 180 can be a still image or video and also can be a 2D image or a 3D image.

Additionally, the processor 170 can play content stored in the display device 100, received broadcast content, and external input content input from the outside, and the content can be in various formats such as broadcast images, external input images, audio files, still images, accessed web screens, and document files.

The processor 170 may determine at least one executable operation of the display device 100 based on information determined or generated by using a data analysis algorithm or a machine learning algorithm. The processor 170 may control the components of the display device 100 to execute the determined operation.

To this end, the processor 170 may request, search, receive, or utilize data of the learning processor 160 or the memory 140. The processor 170 may control the components of the display device 100 to execute the predicted operation or the operation determined to be desirable among the at least one executable operation.

The processor 170 may acquire intention information for the user input and may determine the user's requirements based on the acquired intention information.

The processor 170 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 160, may be learned by the learning processor 440 of an artificial intelligence server 400, or may be learned by their distributed processing.

The processor 170 may collect history information including the operation contents of the display device 100 or the user's feedback on the operation and may store the collected history information in the memory 140 or the learning processor 160 or transmit the collected history information to the external device such as the AI server 400. The collected history information may be used to update the learning model.

The display 180 may convert image signals, data signals, and OSD signals processed by the processor 170, or image signals or data signals received from the external device interface 135 into R, G, and B signals to output images.

Meanwhile, the display device 100 illustrated in FIG. 1 is merely an embodiment of the present disclosure, and some of the illustrated components may be integrated, added, or omitted according to the specifications of the display device 100 that are actually implemented.

In an embodiment, two or more components of the display device 100 may be combined into one component, or one component may be divided into two or more components as necessary. In addition, a function performed in each block is for describing an embodiment of the present disclosure, and its specific operation or device does not limit the scope of the present disclosure.

According to an embodiment of the present disclosure, unlike the display device 100 shown in FIG. 1, the display device 100 may receive an image through the network interface 133 or the external device interface 135 without a tuner 131 and a demodulator 132 and play back the same. For example, the display device 100 can be divided into an image processing device such as a set-top box for receiving broadcast signals or contents according to various network services and a content playback device for playing contents input from the image processing device. In this case, an operation method of the display device according to an embodiment of the present disclosure will be described below may be implemented by not only the display device 100 as described with reference to FIG. 1 and but also one of an image processing device such as the separated set-top box and a content playback device including the display 180 the audio output interface 185.

Figure 2:
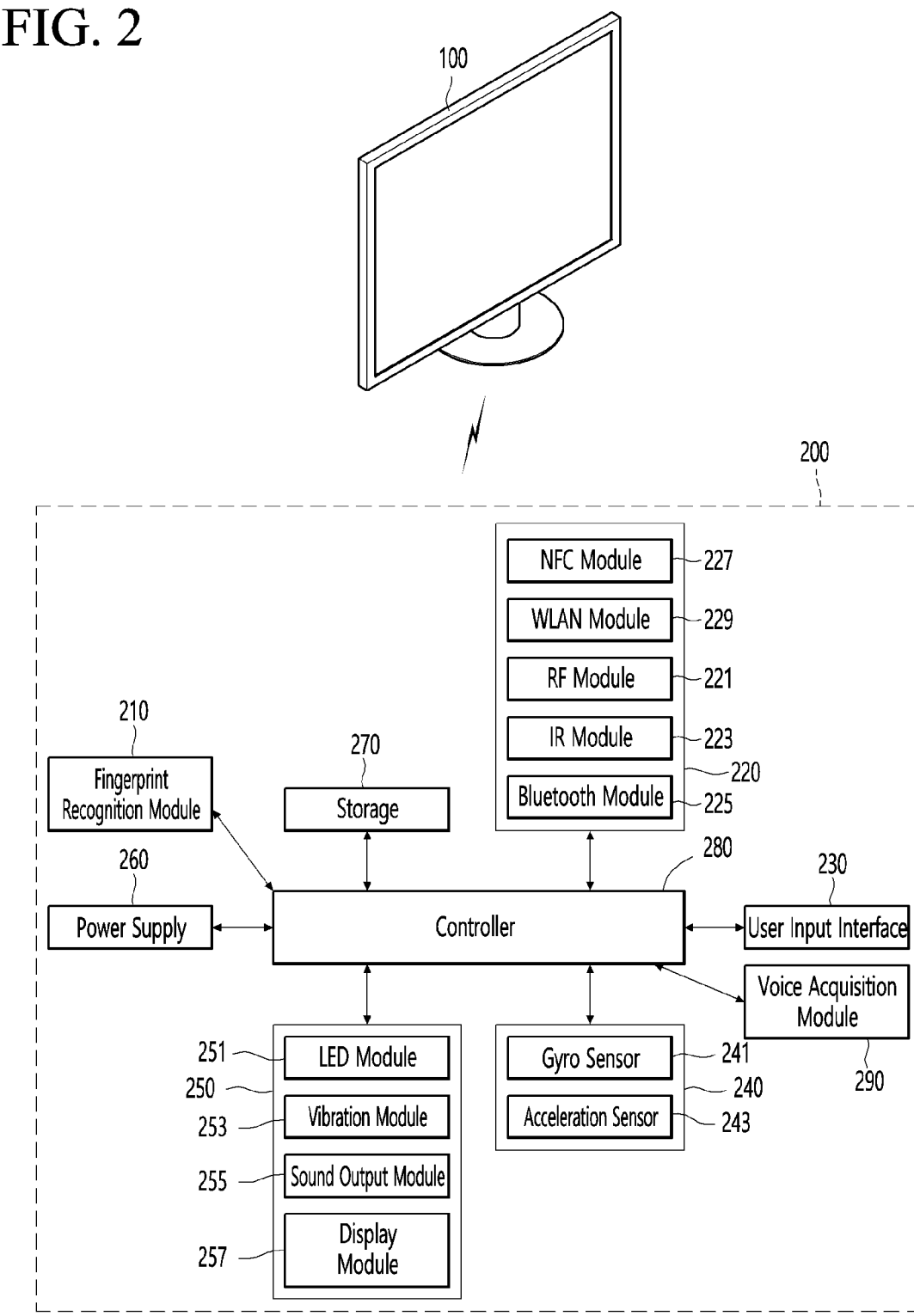
FIG. 2 is a block diagram illustrating a remote control device 200 according to an embodiment of the present disclosure.

FIG. 2 is a block diagram illustrating a remote control device 200 according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

The wireless communication interface 220 may transmit and receive signals to and from any one of display devices according to the above-mentioned embodiments of the present disclosure.

The remote control device 200 may include an RF module 221 for transmitting/receiving signals to/from the display device 100 according to the RF communication standards and an IR module 223 for transmitting/receiving signals to/from the display device 100 according to the IR communication standards. Additionally, the remote control device 200 may include a Bluetooth module 225 for transmitting/receiving signals to/from the display device 100 according to the Bluetooth communication standards. Additionally, the remote control device 200 may include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards In addition, the remote control device 200 may transmit a signal containing information on the movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can operate the user input interface 230 to input a command relating to the display device 100 to the remote control device 200. When the user input interface 230 includes a hard key button, the user may input a command related to the display device 100 to the remote control device 200 through a push operation of the hard key button.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key.

The sensor 240 may include a gyro sensor 241 or an acceleration sensor 243, and the gyro sensor 241 may sense information regarding the movement of the remote control device 200. For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output a video or audio signal corresponding to the operation of the user input interface 230 or a signal transmitted from the display device 100. The user may recognize whether the user input interface 230 is operated or whether the display device 100 is controlled through the output interface 250. For example, the output interface 250 may include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

The power supply 260 may supply power to the remote control device 200. The power supply 260 may stop power supply when the remote control device 200 has not moved for a predetermined time to reduce power consumption. The power supply 260 may restart power supply when a predetermined key provided in the remote control device 200 is operated.

The memory 270 may store various types of programs and application data required for control or operation of the remote control device 200.

When the remote control device 200 wirelessly transmits and receives signals to or from the display device 100 through the RF module 221, the remote control device 200 and the display device 100 may transmit and receive signals through a predetermined frequency band. The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication interface 225.

The voice acquisition module 290 may obtain a speech. The voice acquisition module 290 may include at least one microphone 291 and obtain a speech through the microphone 291.

Figure 3:
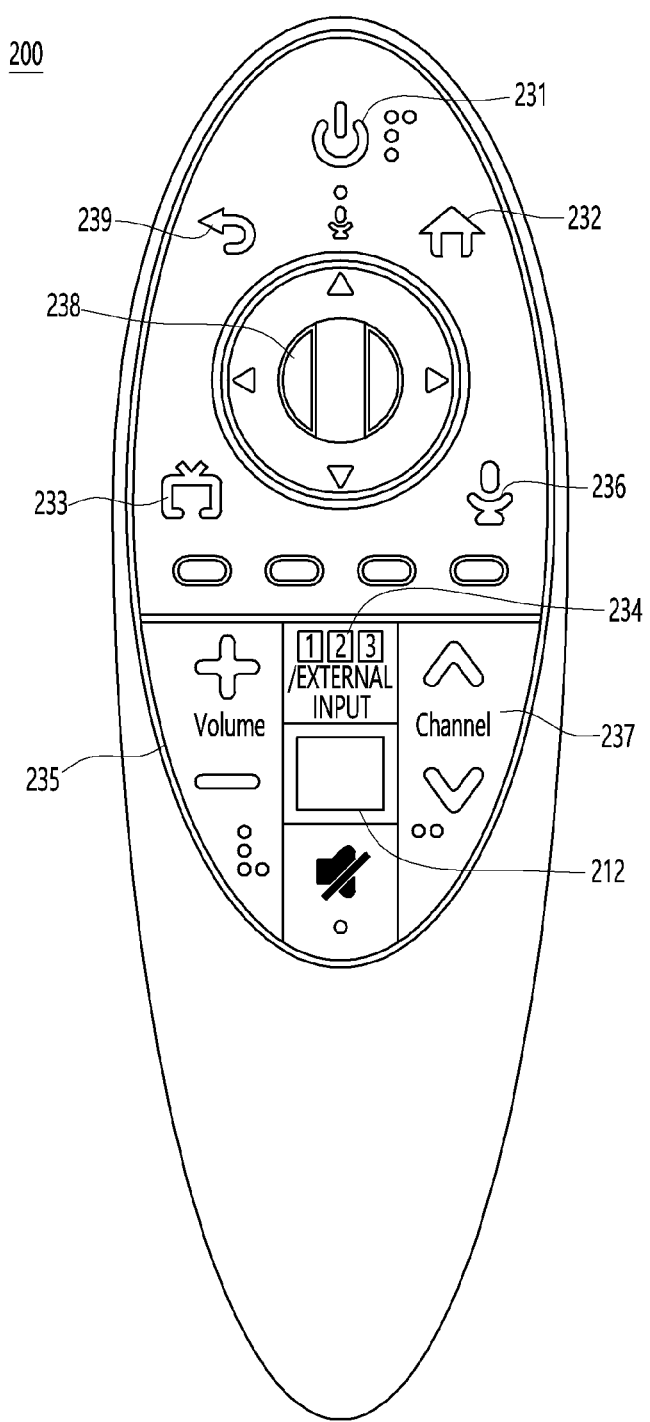
FIG. 3 is a block diagram showing a remote control device 200 according to an embodiment of the present disclosure.

FIG. 3 is a block diagram showing a remote control device 200 according to an embodiment of the present disclosure.

Referring to FIG. 3, the remote control device 200 may include a plurality of buttons. The plurality of buttons may include a fingerprint recognition button 212, a power button 231, a home button 232, a live button 233, an external input button 234, a volume control button 235, a speech recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation. The power button 231 may be a button for turning on/off the power of the display device 100. The home button 232 may be a button for moving to the home screen of the display device 100. The live button 233 may be a button for displaying a real-time broadcast program. The external input button 234 may be a button for receiving an external input connected to the display device 100. The volume control button 235 may be a button for adjusting the level of the volume output by the display device 100. The speech recognition button 236 may be a button for receiving a user's voice and recognizing the received voice. The channel change button 237 may be a button for receiving a broadcast signal of a specific broadcast channel. The OK button 238 may be a button for selecting a specific function, and the back-play button 239 may be a button for returning to a previous screen.

Figure 4:
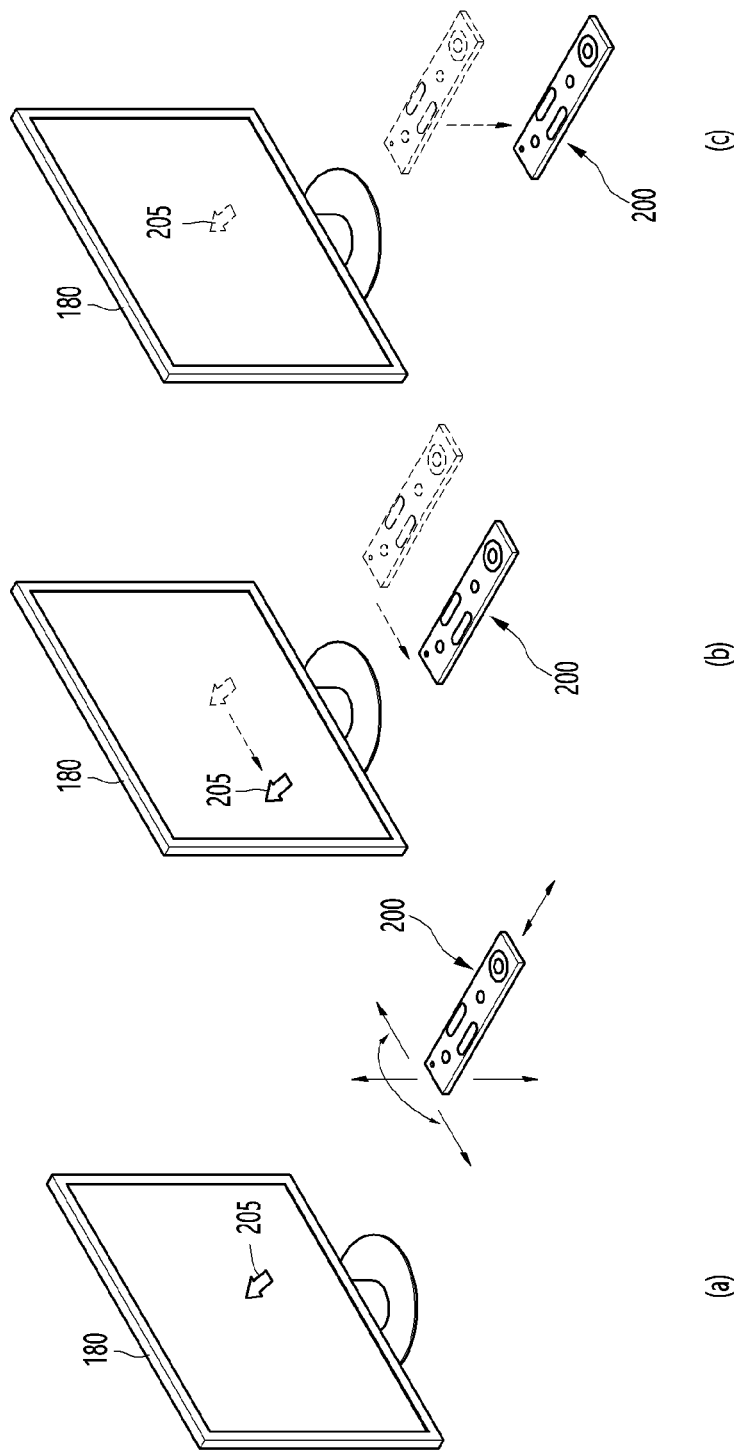
FIG. 4 shows an example of interworking with the display device 100 through a remote control device 200 according to an embodiment of the present disclosure.

FIG. 4 shows an example of interworking with the display device 100 through a remote control device 200 according to an embodiment of the present disclosure.

Referring to (a) in FIG. 4, the user may move or rotate the remote control device 200 up, down, left and right.

The pointer 205 displayed on the display 180 of the display device 100 may move in correspondence with the movement of the remote control device 200. The pointer 205 is moved and displayed according to movement of the remote control device 200 in a 3D space, so the remote control device 200 may be called a space remote control device.

Referring to (b) in FIG. 4, when the user moves the remote control device 200 to the left, the pointer 205 displayed on the display 180 of the display device 100 may also move to the left correspondingly.

Information on the movement of the remote control device 200 detected through a sensor of the remote control device 200 may be transmitted to the display device 100. The display device 100 may calculate the coordinates of the pointer 205 based on information on the movement of the remote control device 200 and display the pointer 205 to correspond to the calculated coordinates.

Referring to (c) in FIG. 4, when the user moves the remote control device 200 to be far from the display 180 while a specific button of the remote control device 200 is being pressed, the selected area in the display 180 corresponding to the pointer 205 may be zoomed in and displayed expanded. Conversely, when the user moves the remote control device 200 to be close to the display 180 while a specific button of the remote control device 200 is being pressed, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Figure 5:
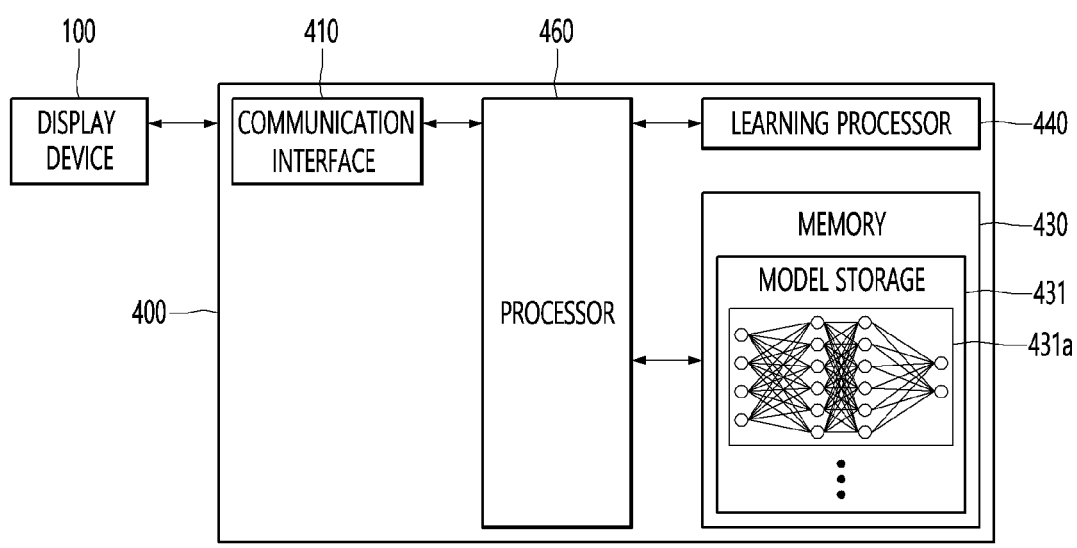
FIG. 5 is a block diagram illustrating an artificial intelligence (AI) server 400 according to an embodiment of the present disclosure.

FIG. 5 is a block diagram illustrating an artificial intelligence (AI) server 400 according to an embodiment of the present disclosure.

Referring to FIG. 5, the AI server 400 may refer to a device that learns an artificial neural network by using a machine learning algorithm or uses a learned artificial neural network. The AI server 400 may include a plurality of servers to perform distributed processing, or may be defined as a 5G network.

The AI server 400 may perform at least part of the AI processing of the display device 100 together. The artificial intelligence processing may mean an operation required for training of an artificial intelligence model.

The AI server 400 may include a communication interface 410, a memory 430, a learning processor 440, a processor 460, and the like.

The communication interface 410 can transmit and receive data to and from an external device such as the display device 100.

The memory 430 may include a model storage 431. The model storage 431 may store a model 431a (or an artificial neural network), which is being trained or has been trained, through the learning processor 440.

The learning processor 440 may learn the artificial neural network 431a by using the learning data. The learning model may be used in a state of being mounted on the AI server 400 of the artificial neural network, or may be used in a state of being mounted on an external device such as the display device 100.

The learning model may be implemented in hardware, software, or a combination of hardware and software. If all or part of the learning models are implemented in software, one or more instructions that constitute the learning model may be stored in memory 430.

The processor 460 may infer the result value for new input data by using the learning model and may generate a response or a control command based on the inferred result value.

The process of performing speech recognition largely consists of recognizing a speech recognition starting word for activating a speech recognition function and recognizing a speech uttered when the speech recognition function has been activated. The speech recognition starting word may be a preset word (especially set by a manufacturer or developer).

In general, a speech recognition engine that recognizes general spoken speech (e.g., STT engine, NLP engine, NLU engine, or the like) requires much more complex and many operations than a starting word recognition engine that recognizes a speech recognition starting word in that various sentences each composed of several words should be recognized rather than recognizing a preset word with respect to a speech uttered while the speech recognition function is activated. Accordingly, the display device 100 may directly recognize a general spoken speech using the speech recognition engine when the processor 170 has sufficient computing power, and recognize a general spoken speech through the external artificial intelligence device 200 when the processor 170 has insufficient computing power.

On the other hand, since the starting word recognition engine for recognizing a speech recognition starting word merely needs to recognize a preset starting word, the starting word recognition engine requires less complex and fewer operations than a speech recognition engine that recognizes a general spoken speech. Accordingly, the display device 100 may recognize a speech recognition starting word using an internal starting word recognition engine mounted therein without the help of an external artificial intelligence server 400.

Figure 6:
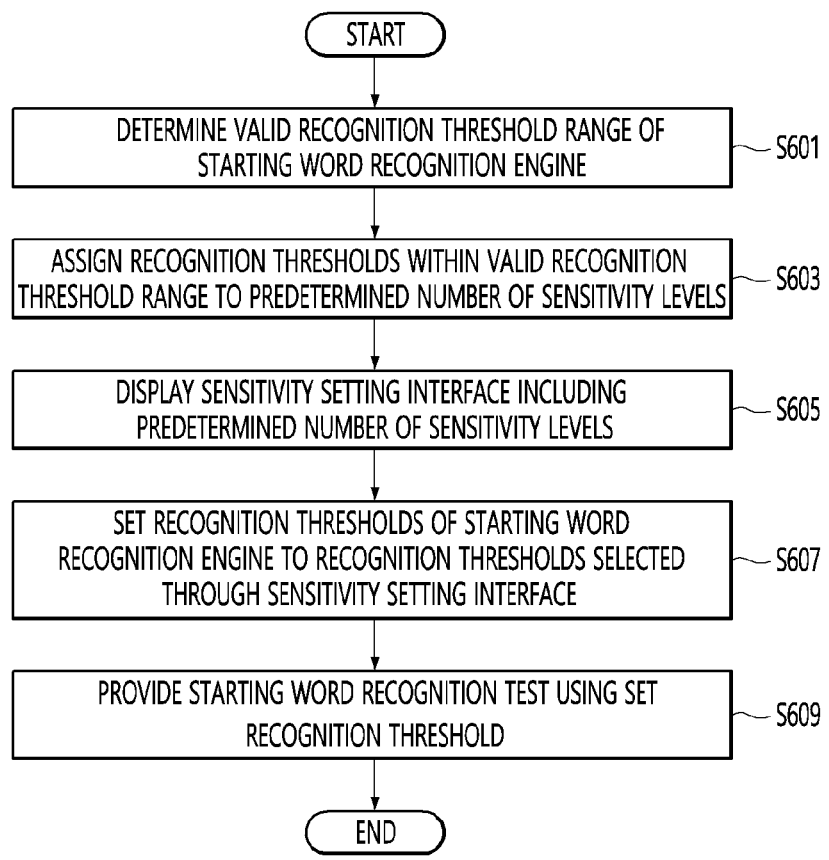
FIG. 6 is a flowchart illustrating a method of providing a function for adjusting a recognition sensitivity of a speech recognition starting word according to an embodiment of the present disclosure.

FIG. 6 is a flowchart illustrating a method of providing a function for adjusting a recognition sensitivity of a speech recognition starting word according to an embodiment of the present disclosure.

Referring to FIG. 6, the processor 170 of the display device 100 may determine an valid recognition threshold range of the starting word recognition engine (S601).

The starting word recognition engine of the display device 100 may be trained or generated to have a performance higher than a certain reference value (e.g., a recognition rate of 85%) from previously collected starting word samples. The starting word recognition engine may be a rule-based model or a machine learning model trained using a machine learning algorithm.

Indicators representing the performance of the starting word recognition engine include a False Acceptance Rate (FAR) and a False Rejection Rate (FRR) The false acceptance rate indicates how often an input that should not be recognized is recognized and in the present disclosure, may mean a rate at which a starting word is not uttered but recognized as a starting word. The false rejection rate indicates how often an input to be recognized is not recognized and in the present disclosure, may mean a rate at which a starting word is uttered but not recognized as a starting word. In general, the false rejection rate and the false acceptance rate have a negative correlation with each other. That is, lowering the false rejection rate in the starting word recognition engine may mean lowering a starting word recognition sensitivity, and in this case, the false acceptance rate may increase. Therefore, it is very difficult to extremely reduce the false rejection rate and the false acceptance rate at the same time, and in order to lower one of the false rejection rate and the false acceptance rate, it is necessary to accept an increase in the other one.

The starting word recognition engine may calculate a starting word recognition score by performing a predetermined operation on input sound, and determine whether the speech recognition starting word is included in the input sound by comparing the calculated starting word recognition score with a predetermined recognition threshold. The starting word recognition score may be an index indicating a possibility that the starting word is included in the input sound. In an embodiment, a higher starting word recognition score may mean that the input sound is more likely to include the starting word. In another embodiment, a lower starting word recognition score may mean that the input sound is more likely to include the starting word.

Hereinafter, unless otherwise specified, it is assumed that the higher the starting word recognition score, the higher the possibility that the input sound includes the starting word.

The range of the starting word recognition score may be set in various ways. For example, the starting word recognition score may be set to a range of 0 to 1. The starting word recognition score may have a different range for each starting word recognition engine. For example, the starting word recognition score for a first starting word recognition engine may be set in the range of 0 to 10, and the starting word recognition score for a second starting word recognition engine may be set in the range of 0 to 15.

A recognition threshold may refer to a reference value for determining whether a starting word is included in an input sound, which may indicate a starting word recognition sensitivity. In one embodiment, when the higher the starting word recognition score means that the input sound is more likely to contain the starting word, the larger the recognition threshold is, the smaller the starting word recognition sensitivity, which may mean that the recognition threshold has a negative correlation with the starting word recognition sensitivity. In another embodiment, when the lower the starting word recognition score means that the input sound is more likely to contain the starting word, the smaller the recognition threshold is, the lower the starting word recognition sensitivity, which may mean that the recognition threshold has a positive correlation with the starting word recognition sensitivity. Hereinafter, the term 'recognition threshold' and the term 'starting word recognition sensitivity' may be used interchangeably.

The recognition threshold may be set to a value for which the starting word recognition engine has performance equal to or higher than a predetermined reference value by the manufacturer or developer as a default value, which may be referred to as a reference recognition threshold or a default recognition threshold. The reference recognition threshold may be a recognition threshold that minimizes a false acceptance rate while satisfying a minimum recognition rate to be satisfied.

The processor 170 may receive a reference recognition threshold from a central server (not shown) or the artificial intelligence server 400 through the communication interface 110 and update a reference recognition threshold of a starting word recognition model with the received reference recognition threshold.

The higher the recognition threshold, the higher the starting word recognition sensitivity of the starting word recognition engine. As a result, the false acceptance rate of the starting word recognition engine may decrease and the false rejection rate may increase. However, when the recognition threshold increases above a certain level or decreases below a certain level, the amount of change in the false acceptance rate and the amount of change in the false rejection rate are very small compared to the amount of change in the recognition threshold.

A valid recognition threshold range (or valid recognition sensitivity range) may refer to a range of recognition thresholds in which the amount of change in the false acceptance rate with respect to the amount of change in the recognition threshold or the amount of change in the false rejection rate with respect to the amount of change in the recognition threshold is larger than a predetermined value. Accordingly, the processor 170 may determine, as the valid recognition threshold range (or valid recognition sensitivity range), a range of recognition thresholds in which the amount of change in the false acceptance rate with respect to the amount of change in the recognition threshold or the amount of change in the false rejection rate with respect to the amount of change in the recognition threshold is larger than a predetermined value. For example, the processor 170 sets the range of recognition thresholds in which the amount of change in the false rejection rate or the amount of change in the false acceptance rate is 5% or more while the recognition threshold changes by 1% relative to the size of the range of starting word recognition scores. can be determined by Alternatively, the valid recognition threshold range may mean a range of recognition thresholds in which at least one of the false acceptance rate and the false rejection rate has a predetermined range. Accordingly, the processor 170 may determine, as a valid recognition threshold range (or a valid recognition sensitivity range), a valid recognition threshold range in which at least one of the false acceptance rate and the false rejection rate has a predetermined range. For example, the processor 170 may determine, as a valid recognition threshold range (or a valid recognition sensitivity range), a valid recognition threshold range in which at least one of the false acceptance rate and the false rejection rate satisfies 5% or more and 95% or less.

Then, the processor 170 of the display device 100 may assign recognition thresholds within the valid recognition threshold range to a predetermined number of sensitivity levels (S603).

The display device 100 may provide a predetermined number (e.g., 7) of sensitivity levels so as to adjust a sensitivity in a predetermined number (e.g., 7) of steps. To this end, the processor 170 may assign recognition thresholds within the valid recognition threshold range (or the valid recognition sensitivity range) to the sensitivity levels, respectively. A detailed method of assigning a recognition threshold to each sensitivity level will be described later.

Then, the processor 170 of the display device 100 may display a sensitivity setting interface including a predetermined number of sensitivity levels through the display 180 (S605).

The sensitivity setting interface may include an option for selecting one of a plurality of sensitivity levels. For example, the sensitivity setting interface may include a drop-down list, a value input box, a value selection button, a slide bar, or the like.

The user is able to set the sensitivity level through the sensitivity setting interface.

The processor 170 may display a sensitivity level corresponding to a reference sensitivity threshold (or a default sensitivity threshold) to be distinguished from other sensitivity levels among a plurality of sensitivity levels in the sensitivity setting interface. This may mean recommending a sensitivity level corresponding to the reference sensitivity threshold among the plurality of sensitivity levels.

Furthermore, when the reference sensitivity threshold is updated, the processor 170 may display information indicating that the reference sensitivity threshold has been updated in the sensitivity setting interface and display a sensitivity level corresponding to the updated reference threshold to be distinguished from other sensitivity levels.

Then, the processor 170 of the display device 100 may set a recognition threshold of the starting word recognition engine to the recognition threshold corresponding to a sensitivity level selected through the sensitivity setting interface (S607).

The processor 170 may receive an input for selecting a sensitivity level through the input interface 150 or the remote control device 200 and select the selected sensitivity level based on the received input. Also, the processor 180 may set the recognition threshold of the starting word recognition engine to a recognition threshold corresponding to the selected sensitivity level.

In this way, when the recognition threshold is set by a user's selection, the processor 170 may determine whether the user utters a starting word through the starting word recognition engine using a user-set recognition threshold.

Then, the processor 170 of the display device 100 may provide a starting word recognition test using the set recognition threshold (S609).

Since the recognition threshold to be used by the starting word recognition engine has been newly set, the user needs to check how much the starting word recognition performance is based on the updated recognition threshold (or recognition sensitivity). Accordingly, the processor 170 may provide the starting word recognition test using the newly set recognition threshold, thereby identifying how much the starting word recognition performance changes according to the user's setting (or modification) of recognition sensitivity.

The processor 170 may provide a starting word recognition test by displaying a starting word recognition test interface through the display 180. The starting word recognition test may include requesting to utter the starting word until the starting word is recognized a predetermined number of times, and displaying the number of successfully recognized starting words.

The sequence of steps shown in FIG. 6 is only an example, and the present disclosure is not limited thereto. That is, according to an embodiment, the order of some of the steps shown in FIG. 6 may be reversed to be performed. In an embodiment, some of the steps shown in FIG. 6 may be performed in parallel. Further, only some of the steps shown in FIG. 6 may be performed.

Figure 7:
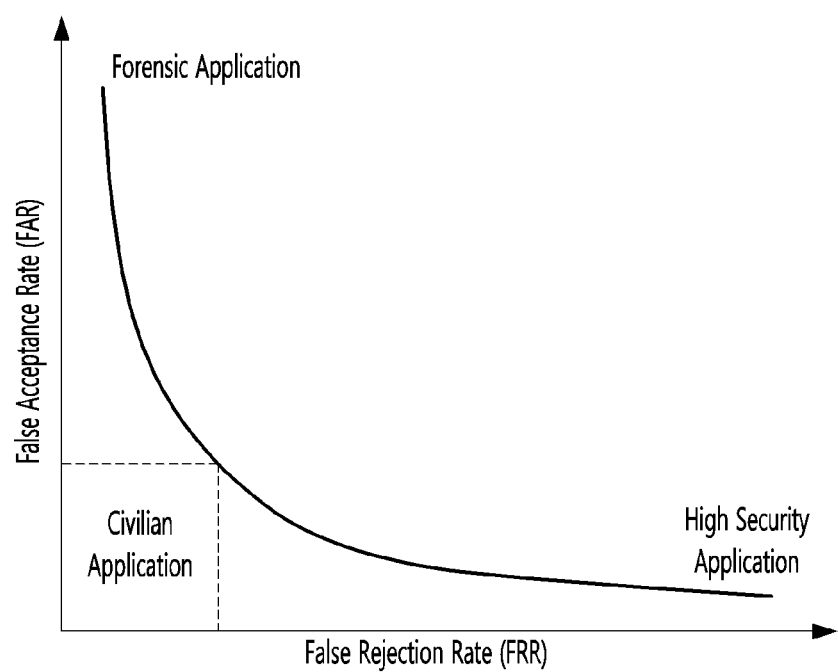
FIG. 7 is a diagram illustrating a relationship between a false acceptance rate and a false rejection rate of a starting word recognition engine.

FIG. 7 is a diagram illustrating a relationship between a false acceptance rate and a false rejection rate of a starting word recognition engine.

Referring to FIG. 7, it can be seen that the false rejection rate (FRR) of the starting word recognition engine and the false acceptance rate (FAR) of the starting word recognition engine have a negative correlation with each other. The relationship between the false rejection rate and the false acceptance rate of the starting word recognition engine shows the same aspect as the relationship between the false rejection rate and the false acceptance rate of various biometric recognition engines or biometric authentication engines.

When the starting word recognition engine operates very sensitively and strictly to increase the reliability of the starting word recognition (or the accuracy of the starting word recognition), the false acceptance rate is very low. Conversely, situations in which recognition fails even through the starting word is uttered frequently occur, and, the false acceptance rate relatively increases. On the other hand, as the more insensitively the starting word recognition engine operate to increase the success rate of starting word recognition, the lower the false rejection rate. Conversely, situations in which it is determined that the starting word is recognized even though the starting word is not uttered frequently occur, and the false rejection rate relatively increases.

Security applications requiring high reliability, which do not misrecognize wrong objects may be configured to minimize the false acceptance rate while partially conceding the false rejection rate. On the other hand, a forensic application that needs to recognize a target to be recognized well may be configured to minimize the false rejection rate while partially conceding the false acceptance rate. In addition, everyday applications or commercial applications that require appropriate performance may be configured to compromise between the false rejection rate and the false acceptance rate in an appropriate line.

Figure 8:
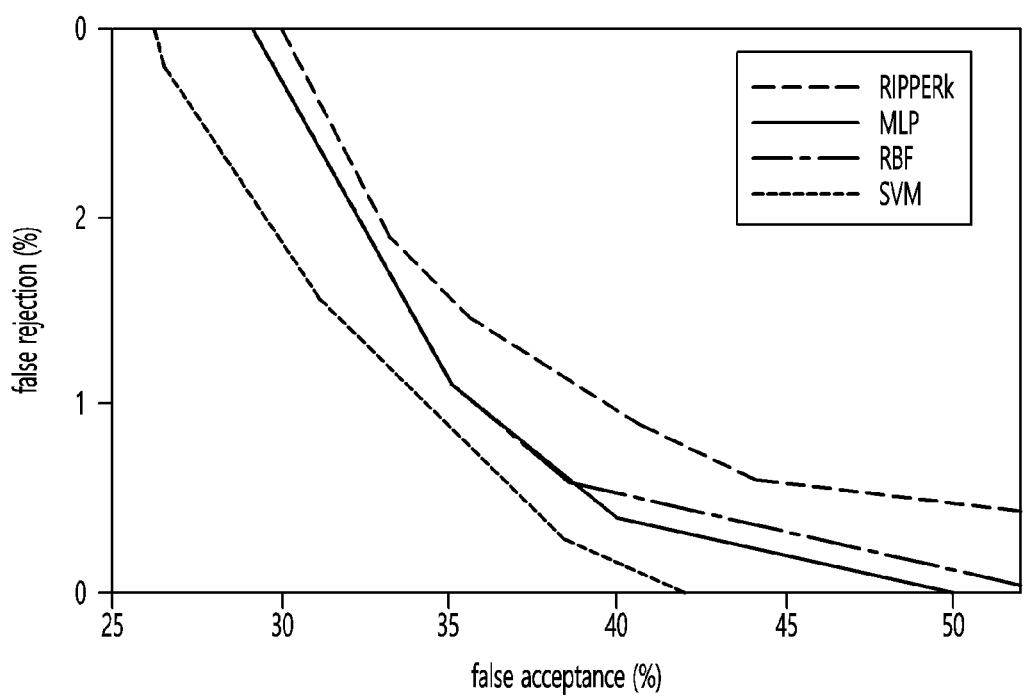
FIG. 8 is a diagram showing a relationship between a false acceptance rate and a false rejection rate for each of the recognition engines based on different algorithms.

FIG. 8 is a diagram showing a relationship between a false acceptance rate and a false rejection rate for each of the recognition engines based on different algorithms.

Referring to FIG. 8, it can be seen that the relationship between the false acceptance rate and the false rejection rate is similar between recognition engines based on the RIPPERk algorithm, Multi-Layer Perceptron (MLP), Radial Basis Function (RBF), and Support Vector Machine (SVM), but there are some differences in specific false acceptance rates and false rejection rates. This means that different references may be applied as the recognition sensitivity or the recognition threshold depending on an algorithm used to implement the (starting word) recognition engine.

Although not shown in FIG. 8, different recognition sensitivities or recognition thresholds may be applied to recognition engines that recognize different languages even though the same algorithm is used. For example, a Korean-based starting word recognition engine may have a range of starting word recognition scores of 1 to 13, and an English-based starting word recognition engine may have a range of starting word recognition scores of 3 to 21. Different ranges of starting word recognition scores may mean that the recognition thresholds or recognition sensitivities used to determine starting word recognition are different.

Figure 9:
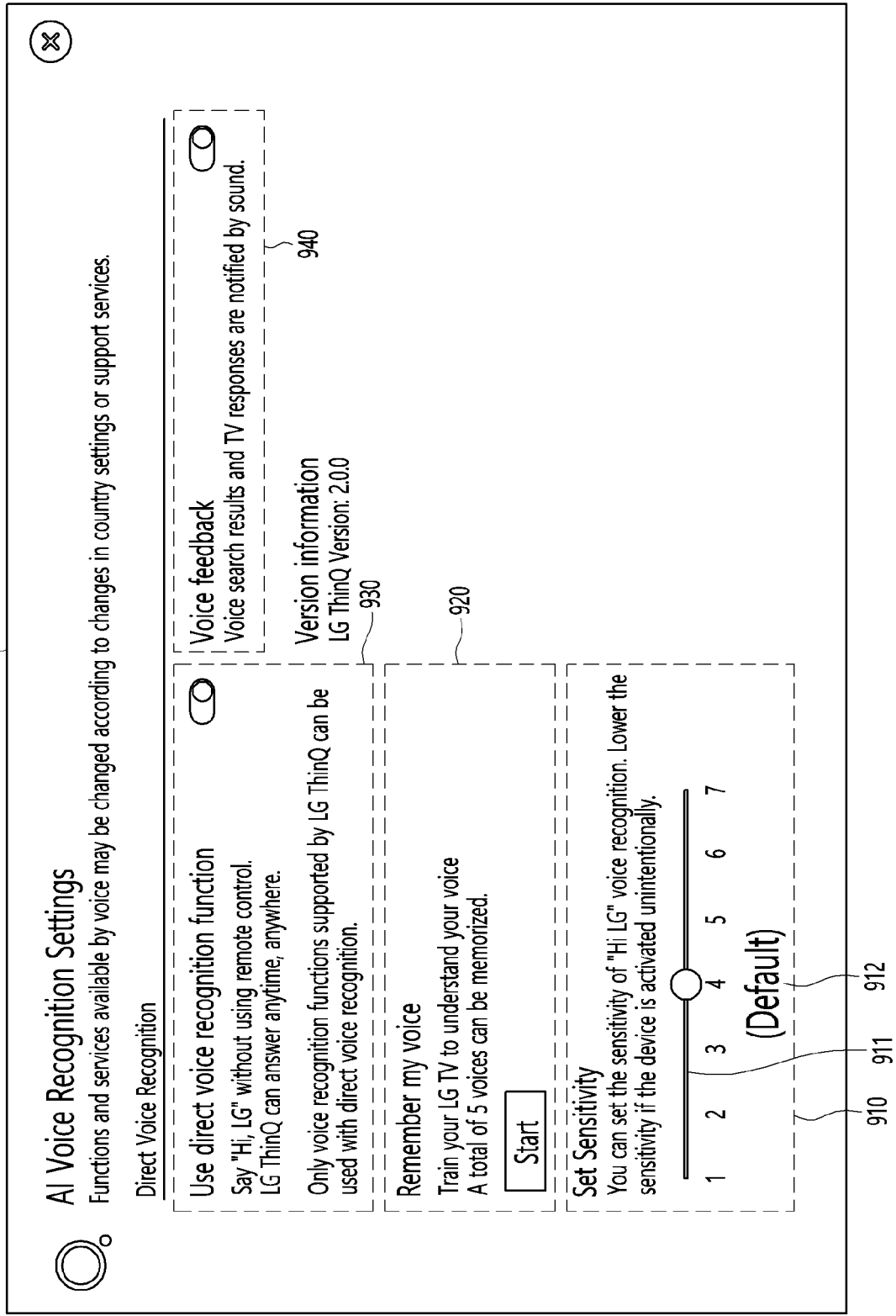
FIG. 9 is a diagram illustrating a sensitivity setting interface according to an embodiment of the present disclosure.

FIG. 9 is a diagram illustrating a sensitivity setting interface according to an embodiment of the present disclosure.

Referring to FIG. 9, the sensitivity setting interface 910 may be included in a speech recognition setting interface 900, but the present disclosure is not limited thereto. The speech recognition setting interface 900 may include not only the sensitivity setting interface 910 for setting the recognition sensitivity of the starting word, but also an interface 920 for entering a voice setting interface for setting individual voices, an interface 930 for setting whether to activate a speech recognition function or an interface 940 for setting whether or not to activate a speech feedback function.

The sensitivity setting interface 910 may include a slide bar 911 for selecting one sensitivity level from among a plurality of sensitivity levels. In the example of FIG. 9, the starting word recognition sensitivity is shown to be divided into 7 sensitivity levels, but the number of sensitivity levels may be more than 7 or less than 7 depending on embodiments.

Also, the sensitivity setting interface 910 may include information 912 indicating a reference sensitivity level (or default sensitivity level) corresponding to a reference recognition threshold (or default recognition threshold). As described above, the reference recognition threshold may mean a recognition threshold set by a developer or manufacturer.

Figure 10:
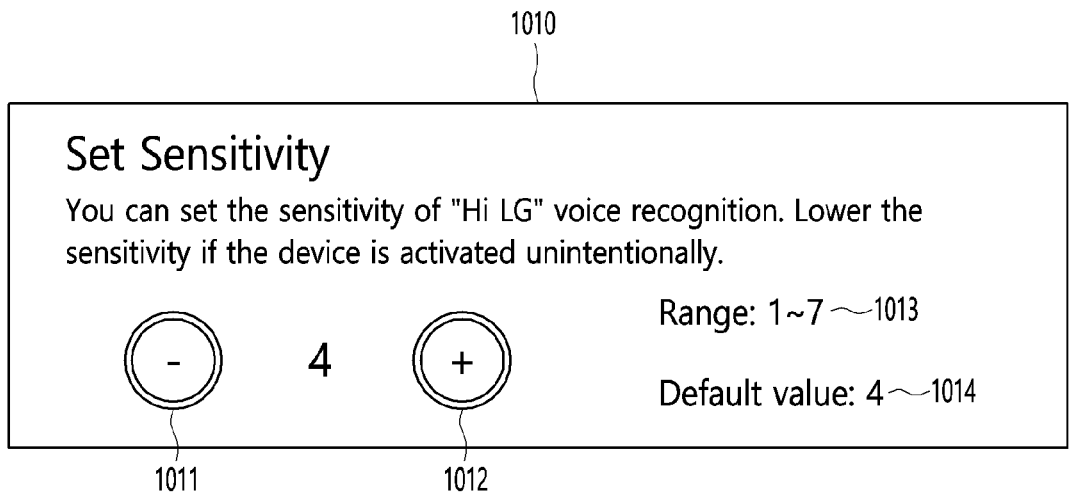
FIG. 10 is a diagram illustrating a sensitivity setting interface according to an embodiment of the present disclosure.

FIG. 10 is a diagram illustrating a sensitivity setting interface according to an embodiment of the present disclosure.

Referring to FIG. 10, a sensitivity setting interface 1010 may include sensitivity adjustment buttons 1011 and 1012 for adjusting a sensitivity level among a plurality of sensitivity levels. In the example of FIG. 10, the starting word recognition sensitivity is shown to be divided into 7 sensitivity levels, but the number of sensitivity levels may be more than 7 or less than 7 depending on embodiments.

Also, the sensitivity setting interface 1010 may include information 1013 indicating a range of sensitivity levels and information 1014 indicating a reference sensitivity level (or default sensitivity level) corresponding to a reference recognition threshold (or default recognition threshold).

Figure 11:
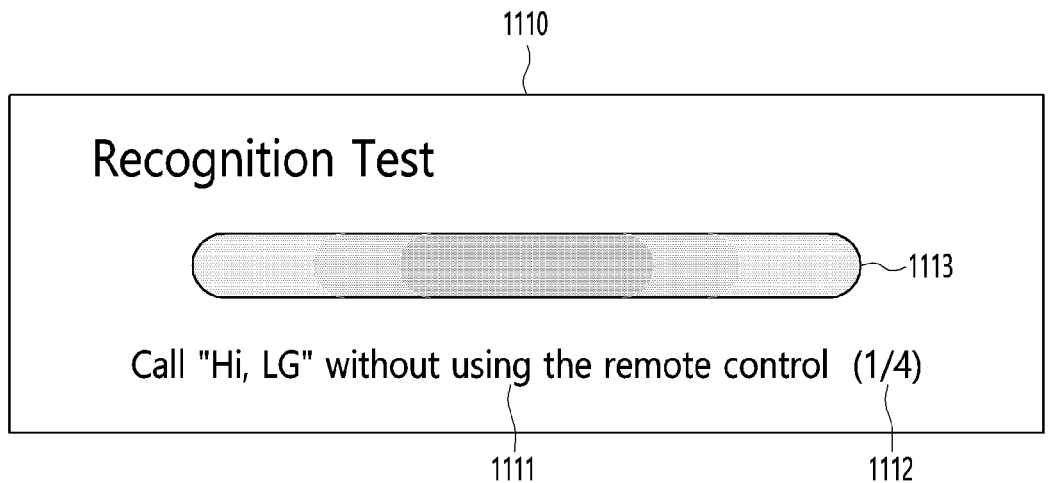
FIG. 11 is a diagram illustrating a starting word recognition test interface according to an embodiment of the present disclosure.

FIG. 11 is a diagram illustrating a starting word recognition test interface according to an embodiment of the present disclosure.

Referring to FIG. 11, a starting word recognition test interface 1110 may include a notice 1111 requesting to utter a starting word until the starting word is recognized a predetermined number of times, and information 1112 indicating the number of starting words that have been successfully recognized.

Furthermore, the starting word recognition test interface 1110 may further include a sound visualization image 1113 whose color or shape changes according to an input sound. The user may identify whether sound is well input to the display device 100 currently through the sound visualization image 1113.

Figure 12:
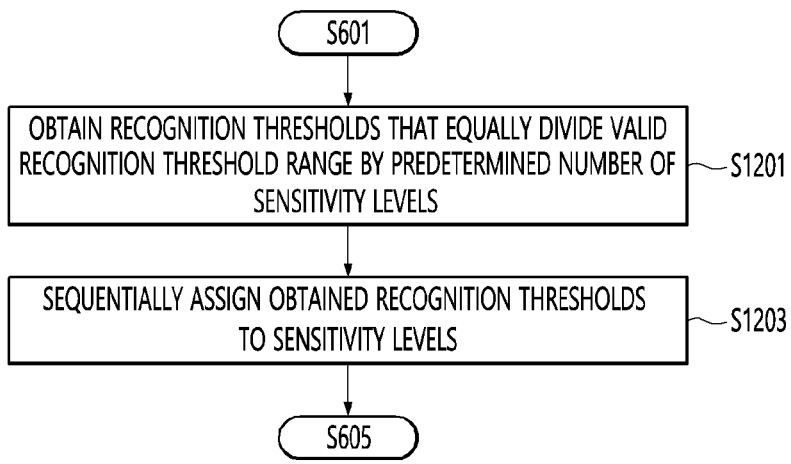
FIG. 12 is a flowchart illustrating an example of an operation (S603) of assigning recognition thresholds within an valid recognition threshold range to the sensitivity levels shown in FIG. 6.

FIG. 12 is a flowchart illustrating an example of operation of assigning recognition thresholds within a valid recognition threshold range to the sensitivity levels shown in FIG. 6 (S603).

Referring to FIG. 12, the processor 170 may obtain recognition thresholds that equally divide the valid recognition threshold range by the predetermined number of sensitivity levels (S1201).

The number of sensitivity levels may be preset by a developer or manufacturer. For example, the number of the sensitivity levels may be set to 7.

When the predetermined number of sensitivity levels is 7 and the valid recognition threshold range has a range of 1 to 7, the processor 170 may equally divide the valid recognition threshold range [1, 7] into 7 to obtain 7 recognition thresholds 1, 2, 3, 4, 5, 6 and 7.

When the predetermined number of sensitivity levels is 5 and the valid recognition threshold range has a range of 0.2 to 0.8, the processor 170 may equally divide the valid recognition threshold range [0.2, 0.8] into 5 to obtain 5 recognition thresholds 0.2, 0.35, 0.5, 0.65 and 0.8.

Then, the processor 170 may sequentially assign the obtained recognition thresholds to sensitivity levels (S1203).

Since the processor 170 has obtained as many recognition thresholds as the number of sensitivity levels, the processor 170 may sequentially assign the obtained recognition thresholds to the sensitivity levels. That is, the processor 170 may assign recognition thresholds, which equally divide the valid recognition threshold range by the number of sensitivity levels, to the sensitivity levels as they are without modification. It is noted that, when the reference recognition threshold is not assigned to any sensitivity level, the processor 170 may calibrate a sensitivity level to which a recognition threshold closest to the reference recognition threshold is assigned as the reference recognition threshold.

When the predetermined number of sensitivity levels is 7 and the obtained 7 recognition thresholds are 1, 2, 3, 4, 5, 6, and 7, the processor 170 may assign the recognition threshold of 1 to a first sensitivity level, assign the recognition threshold of 2 to a second sensitivity level, and in this way, assign a recognition threshold of 7 to a seventh sensitivity level. However, if the reference recognition threshold is 4.5, the processor 170 may calibrate the fourth sensitivity level assigned with the recognition threshold of 4 closest to the reference recognition threshold of 4.5 or the fifth sensitivity level assigned with the recognition threshold of 5 to the reference recognition threshold of 4.5.

When the predetermined number of sensitivity levels is 5 and the valid recognition threshold range is a range of 0.2 to 0.8, the processor 170 may divide the valid recognition threshold range [0.2, 0.8] equally into five, obtain five recognition thresholds of 0.2, 0.35, 0.5, 0.65, 0.8, and assign a recognition threshold of 0.2 to a first sensitivity level, a recognition threshold of 0.35 to a second sensitivity level, and in this way, a recognition threshold of 0.8 to a fifth sensitivity level.

Figure 13:
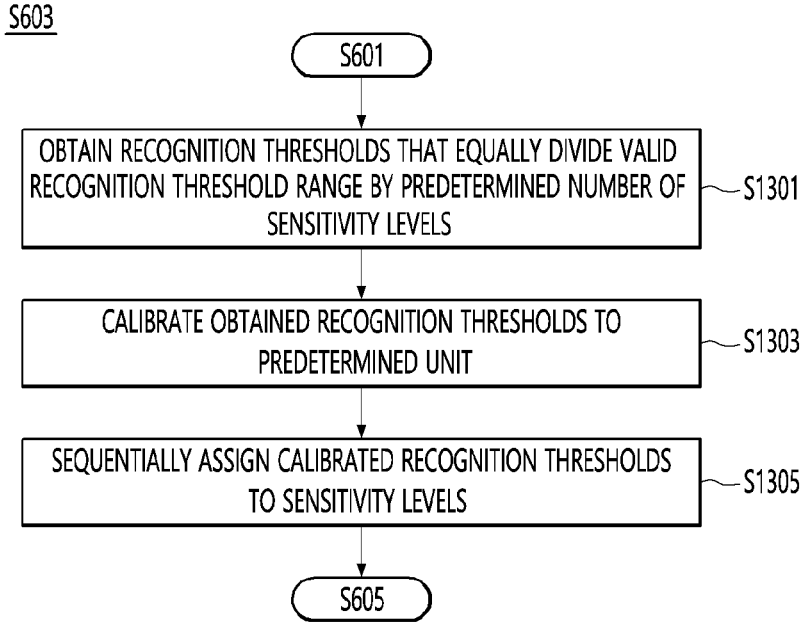
FIG. 13 is a flowchart illustrating an example of an operation (S603) of assigning recognition thresholds within an valid recognition threshold range to the sensitivity levels shown in FIG. 6.

FIG. 13 is a flowchart illustrating an example of assigning recognition thresholds within an valid recognition threshold range to the sensitivity levels shown in FIG. 6 (S603).

Referring to FIG. 13, the processor 170 may obtain recognition thresholds that equally divide a valid recognition threshold range by a predetermined number of sensitivity levels (S1301).

This operation corresponds to the operation of obtaining the recognition thresholds shown in FIG. 12 (S1201), and a duplicate description will be omitted.

Then, the processor 170 may calibrate the obtained recognition thresholds according to a predetermined unit (S1303).

The recognition threshold for used in comparison with the starting word recognition score may be selected from all real number ranges depending on the starting word recognition engines, but may have a predetermined unit. For example, the predetermined unit for the recognition threshold may include an integer unit, an even unit, a unit of 0.1, and a unit of 0.05. The unit for the recognition threshold may be a unit preset by a developer or manufacturer, and may be updated later by a central server (not shown) or the artificial intelligence server 400.

Although the starting word recognition score is a real number in a range of 0 to 1, the recognition threshold may be a real number in a range of 0 to 1 according to the unit of 0.1 (0, 0.1, 0.2, 0.3, 0.4, 0.5, 0.6, 0.7, 0.8, 0.9 or 1). Even though the starting word recognition score is a real number or an integer in a range of 1 to 15, the recognition threshold may be an integer in the range of 1 to 15.

When there is a predetermined unit for the recognition threshold, the processor 170 may calibrate the obtained recognition thresholds according to the predetermined unit. The processor 170 may determine recognition thresholds closest to the obtained recognition thresholds while having a predetermined unit, and calibrate the obtained recognition thresholds to the determined recognition thresholds closest to the obtained recognition thresholds.

Also, when the reference recognition threshold is not assigned to any sensitivity level, the processor 170 may calibrate the sensitivity level to which the recognition threshold closest to the reference recognition threshold is assigned as the reference recognition threshold.

Then, the processor 170 may sequentially assign the calibrated recognition thresholds to the sensitivity levels (S1305).

Since the processor 170 obtains as many recognition thresholds as the number of sensitivity levels and calibrates the obtained recognition thresholds according to a predetermined unit, the processor 170 may assign the calibrated recognition thresholds to the sensitivity levels sequentially.

When the predetermined number of sensitivity levels is 7, the valid recognition threshold range is a range of 1 to 10, and the unit for the recognition threshold is an integer, the processor 170 may obtain seven recognition thresholds 1, 2.5, 4, 5.5, 7, 8.5, and 10 by equally dividing the valid recognition threshold range [1, 10] into 7, round off the obtained recognition thresholds to obtain seven calibrated recognition thresholds 1, 3, 4, 6, 7, 9, and 10, and assign a recognition threshold of 1 to a first sensitivity level, a recognition threshold of 3 to a second sensitivity level, and in this way, a recognition threshold of 10 to a seventh sensitivity level. If the reference recognition threshold is 3, the reference recognition threshold may be provided as one sensitivity level even without calibrating the second sensitivity level because the recognition threshold 3 has already been assigned to the second sensitivity level.

When the predetermined number of sensitivity levels is 5, the valid recognition threshold range is a range of 0.2 to 0.8, and the unit for the recognition threshold is 0.1, the processor 170 may obtain seven recognition thresholds 0.2, 0.35, 0.5, 0.65, and 0.8 by equally dividing the valid recognition threshold range [0.2, 0.8] into 5, round up the obtained recognition thresholds round to 2 decimal places to obtain five calibrated recognition threshold values 0.2, 0.4, 0.5, 0.7, and 0.8, and assign a recognition threshold of 0.2 to a first sensitivity level, a recognition threshold of 0.4 to a second sensitivity level, and in this way, a recognition threshold of 0.8 to a seventh sensitivity level. When the reference recognition threshold is 0.3, the processor 170 may determine that the recognition threshold before calibration of the recognition threshold 0.4 assigned to the second sensitivity level is 0.35, which is closest to the reference recognition threshold value 0.3 and therefore, re-calibrate the recognition threshold assigned to the second sensitivity level to the reference recognition threshold value of 0.3.

Figure 14:
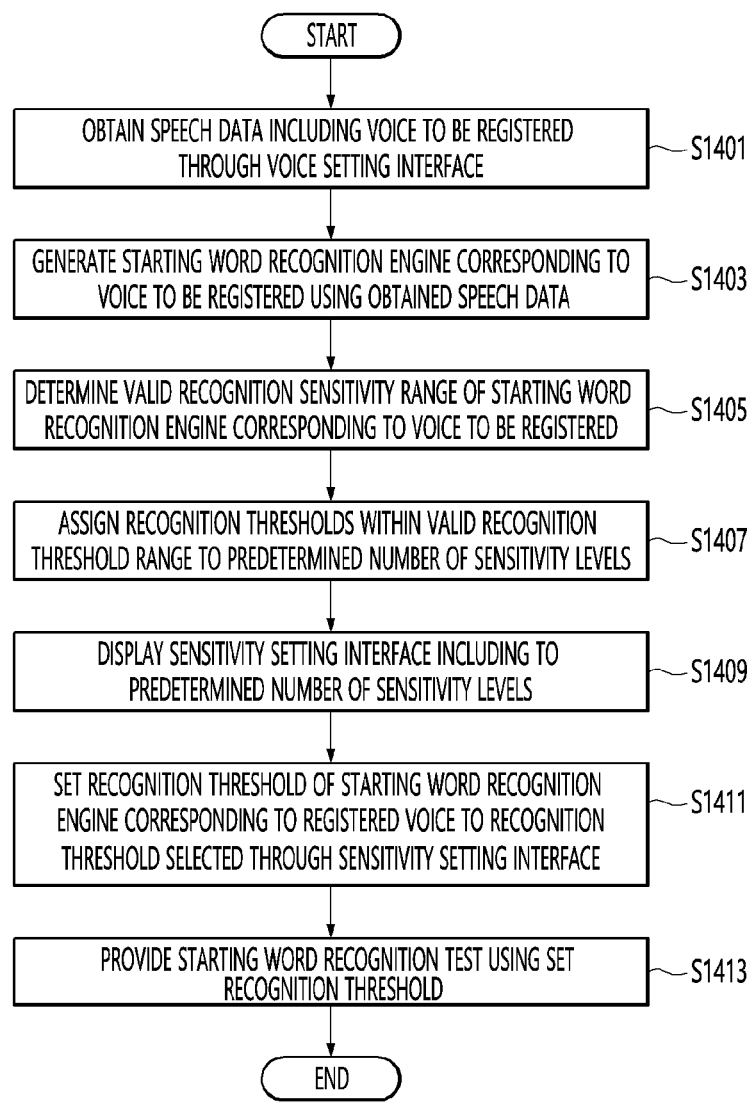
FIG. 14 is a flowchart illustrating a method of providing a function for adjusting a recognition sensitivity of a speech recognition starting word according to an embodiment of the present disclosure.

FIG. 14 is a flowchart illustrating a method of providing a function for adjusting a recognition sensitivity of a speech recognition starting word according to an embodiment of the present disclosure.

Compared with FIG. 6, FIG. 6 shows an embodiment of providing a function of adjusting a recognition sensitivity without classifying users, and FIG. 14 shows an embodiment of providing a function of adjusting a recognition sensitivity by classifying users, if necessary. The recognition sensitivity in the embodiment of FIG. 6 may be referred to as global recognition sensitivity in that the recognition sensitivity is used to recognize the voice of an unregistered user.

Referring to FIG. 14, the processor 170 of the display device 100 may obtain speech data including a voice to be registered through a voice setting interface (S1401).

The voice setting interface may include an interface for registering an individual user's voice and an interface for managing a previously-registered voice or setting a sensitivity of a previously-registered voice. The user may register up to a predetermined number of voices through the voice setting interface, and may differently set a starting word recognition sensitivity for each registered voice.

The processor 170 may register a voice (including re-registering a previously-registered voice) based on an input through the input interface 150 or the remote control device 200, delete a registered voice, or adjust a recognition sensitivity of a registered voice.

Then, the processor 170 of the display device 100 may generate a starting word recognition engine corresponding to the voice to be registered using obtained speech data (S1403).

The processor 170 may generate a starting word recognition engine corresponding to the voice to be registered by training the starting word recognition engine corresponding to the voice to be registered through at least one of the learning processor 160 and the learning processor 440 of the artificial intelligence server 400. When the starting word recognition engine corresponding to the voice to be registered, the voice to be registered may be regarded as registered.

The processor 170 may generate a starting word recognition engine corresponding to a voice to be registered by retraining or updating a default starting word recognition engine using the obtained speech data.

Then, the processor 170 of the display device 100 may determine a valid recognition threshold range of the starting word recognition engine corresponding to the registered voice (S1405).

This step corresponds to the step (S601) of determining the valid recognition threshold range shown in FIG. 6, and a duplicate description will be omitted. It should be noted that, in FIG. 6, the processor 170 determines the valid recognition threshold range of the default starting word recognition engine whereas, in FIG. 14, the processor 170 determines the valid recognition threshold range of the starting word recognition engine corresponding to the registered voice.

Then, the processor 170 of the display device 100 may assign recognition thresholds within the valid recognition threshold range to a predetermined number of sensitivity levels (S1407).

This step corresponds to the step (S603) of assigning recognition threshold values to a predetermined number of sensitivity levels shown in FIG. 6, and a duplicate description will be omitted.

Thereafter, the processor 170 of the display device 100 may display a sensitivity setting interface including a predetermined number of sensitivity levels through the display 180 (S1409).

This step corresponds to the step (S605) of displaying the sensitivity setting interface shown in FIG. 6, and a duplicate description will be omitted.

Then, the processor 170 of the display device 100 may set a recognition threshold of the starting word recognition engine corresponding to the registered voice to the recognition threshold corresponding to a sensitivity level selected through the sensitivity setting interface (S1411).

This step corresponds to the step (S607) of setting the recognition threshold of the starting word recognition engine shown in FIG. 6 to a recognition threshold corresponding to the selected sensitivity level, and a duplicate description will be omitted. It should be noted that, in FIG. 6, the processor 170 sets the recognition threshold of the default starting word recognition engine whereas, in FIG. 14, the processor 170 sets a recognition threshold of the starting word recognition engine corresponding to the registered voice.

Then, the processor 170 of the display device 100 may provide a starting word recognition test using the set recognition threshold (S1413).

This step corresponds to the step (S609) of providing a starting word recognition test shown in FIG. 6, and a duplicate description will be omitted. It should be noted that, in FIG. 6, the processor 170 provides a starting word recognition test using the default starting word recognition engine, whereas, in FIG. 14, the processor 170 provides a starting word recognition test using the starting word recognition engine corresponding to the registered voice.

The order of the steps shown in FIG. 14 is only an example, and the present disclosure is not limited thereto. That is, according to an embodiment, the order of some of the steps shown in FIG. 14 may be reversed to be performed. In an embodiment, some of the steps shown in FIG. 14 may be performed in parallel. Further, only some of the steps shown in FIG. 14 may be performed.

Figure 15:
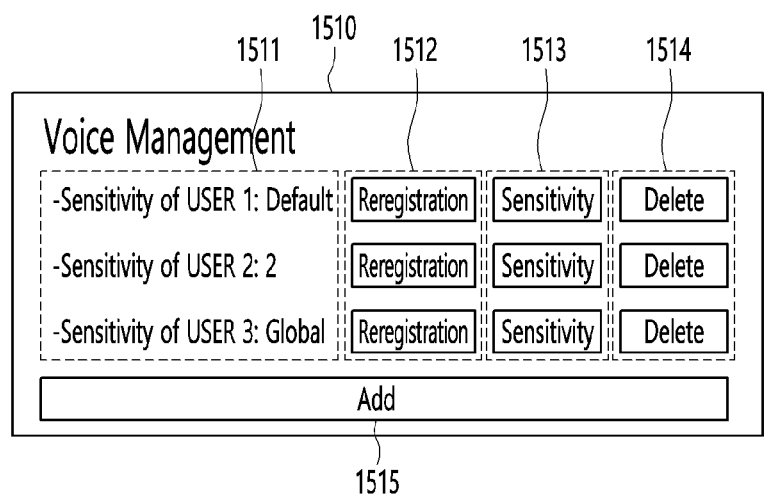
FIG. 15 is a diagram illustrating a voice setting interface according to an embodiment of the present disclosure.

FIG. 15 is a diagram illustrating a voice setting interface according to an embodiment of the present disclosure.

Referring to FIG. 15, a voice setting interface 1510 may include information 1511 indicating sensitivities set for registered voices, an item 1512 for re-registering a registered voice, an item for setting a sensitivity of a registered voice 1513, an item 1514 for deleting a registered voice, and an item 1515 for registering a new voice.

Although the names of the registered voices are set to "USER 1", "USER 2", and "USER 3" in FIG. 15, the names may be changed to other names by a user input.

When the item 1512 for re-registering a registered voice or the item 1515 for registering a new voice is selected, the processor 170 may display a voice registration interface 1610 through the display 180, obtain a voice of a user for registering a new voice or re-registering a previously registered voice and train a starting word recognition engine corresponding to a corresponding voice using the obtained voice. Re-registering an previously registered voice may mean re-training the starting word recognition engine using the newly input voice.

When the item 1513 for setting the sensitivity of the registered voice is selected, the processor 170 may display a sensitivity setting interface, such as the sensitivity setting interface 910 shown in FIG. 9 or the sensitivity setting interface 1010 shown in FIG. 10 through the display 180, and set the sensitivity of the registered voice based on an input through the input interface 150 or the remote control device 200.

When the item 1514 for deleting a registered voice is selected, the processor 170 may delete the registered voice corresponding to the selected item 1514 and the corresponding starting word recognition engine.

For each voice, if there is no separate setting after registration, the recognition sensitivity is set to a default recognition sensitivity or a global recognition sensitivity, which means that the recognition sensitivity of the starting word recognition engine corresponding to the corresponding voice is the default recognition sensitivity of the display device 100 or the global recognition sensitivity. As described above, the default recognition sensitivity (or reference recognition sensitivity) may refer to a recognition sensitivity set in the display device 100 by a developer or manufacturer, and the global recognition sensitivity may refer to a recognition sensitivity set by a user regardless of voice.

When the recognition sensitivity for a specific voice is set to a default recognition sensitivity, even if the global recognition sensitivity is changed through the method shown in FIG. 6, the recognition sensitivity of the corresponding voice is maintained at the default recognition sensitivity (or reference recognition sensitivity). However, when the default recognition sensitivity (or reference recognition sensitivity) is updated by an external central server (not shown) or the artificial intelligence server 400, the recognition sensitivity of a voice whose recognition sensitivity is set to the default recognition sensitivity may be accordingly changed to the updated default recognition sensitivity.

When the recognition sensitivity of a specific voice is set to be a global recognition sensitivity, the recognition sensitivity of the corresponding voice is also changed as the global recognition sensitivity is changed through the method shown in FIG. 6. In this case, even when the default recognition sensitivity (or reference recognition sensitivity) is updated by an external central server (not shown) or the artificial intelligence server 400, the recognition sensitivity of a voice whose recognition sensitivity is set to the global recognition sensitivity may not be changed.

On the other hand, when a recognition sensitivity is individually set for a registered voice, this means that the recognition sensitivity of the starting word recognition engine corresponding to the corresponding voice is set to the individually set recognition sensitivity.

FIG. 16 is a diagram illustrating a voice registration interface according to an embodiment of the present disclosure.

Referring to FIG. 16, a voice recognition interface 1610 may include a guidance 1611 requesting to utter a starting word until a predetermined starting word is recognized a predetermined number of times, and information 1612 indicating the number of starting words that have been successfully recognized.

Furthermore, the voice recognition interface 1610 may further include a sound visualized image 1613 whose color or shape changes according to an input sound. The user may identify whether sound is well input to the display device 100 currently through the sound visualization image 1613.

Although not shown, when the user's voice is successfully obtained through the voice registration interface 1610 shown in FIG. 16, the processor 170 may provide an interface for setting a name or title of the voice.

Figure 17:
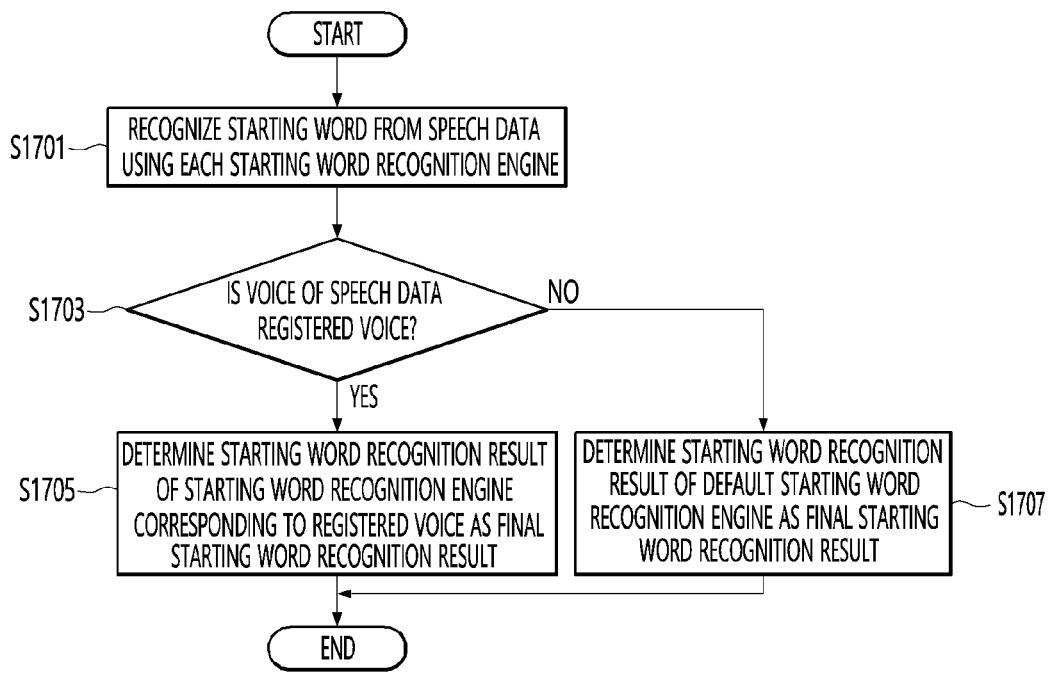
FIG. 17 is a flowchart illustrating a method of recognizing a starting word according to an embodiment of the present disclosure.

FIG. 17 is a flowchart illustrating a method of recognizing a starting word according to an embodiment of the present disclosure.

Referring to FIG. 17, the processor 170 of the display device 100 may recognize a starting word from speech data using each starting word recognition engine (S1701).

The processor 170 may obtain speech data through the input interface 150 or the remote control device 200 and recognize the starting word by determining whether the starting word is included in the speech data using the each starting word recognition engine. Each starting word recognition engine refers to both a default starting word recognition engine and starting word recognition engines respectively corresponding to registered voices. That is, the processor 170 may obtain a starting word recognition result for each starting word recognition engine using all starting word recognition engines that currently exist. In this case, each starting word recognition engine may generate a starting word recognition result based on a set starting word sensitivity (or a recognition threshold).

For example, when the first voice and the second voice are registered, the display device 100 may include a default starting word recognition engine, a first starting word recognition engine corresponding to a first voice, and a second trigger corresponding to the second voice. The default starting word recognition engine may generate a starting word recognition result based on a global recognition sensitivity (or a global recognition threshold), the first starting word recognition engine may generate a starting word recognition result based on a first recognition sensitivity (or a first recognition threshold), and the second starting word recognition engine may generate a starting word recognition result based on a second recognition sensitivity (or a second recognition threshold). Accordingly, the processor 170 may obtain three starting word recognition results by using all of the default starting word recognition engine, the first starting word recognition engine, and the second starting word recognition engine.

Then, the processor 170 of the display device 100 may determine whether the voice of the speech data is a registered voice based on the voice characteristics of the speech data (S1703).

The processor 170 may determine whether the voice of the obtained speech data is a registered voice through waveform analysis, voiceprint analysis, frequency analysis, or the like.

As a result of the determination in step S1703, when the voice of the speech data is a registered voice, the processor 170 may determine the starting word recognition result of the starting word recognition engine corresponding to the registered voice as a final starting word recognition result (S1705).

For example, when the speech data includes the starting word of a registered first voice, the processor 170 may determine, as a final starting word recognition result, a recognition result of the first starting word recognition engine corresponding to the first voice regardless of the recognition results of other starting word recognition engines (e.g., the default starting word recognition engine or the starting word recognition engines corresponding to other voices).

As a result of the determination in step S1703, when the voice of the speech data is not a registered voice, the processor 170 may determine the starting word recognition result of the default starting word recognition engine as a final starting word recognition result (S1707).

For example, when the speech data includes a starting word of an unregistered voice, the processor 170 may determine, as a final starting word recognition result, the recognition result of the default starting word recognition engine regardless of the starting word recognition results of the starting word recognition engines corresponding to registered voices.

Although the embodiment is illustrated in FIG. 17 in which the starting word recognition results are generated using all starting word recognition engines, a voice is determined whether the voice is registered based on voice characteristics, and one of the plurality of starting word recognition results is determined as the final starting word recognition result, the present disclosure is not limited thereto. According to an embodiment, the processor 170 of the display device 100 first determines whether the voice is registered based on voice characteristics, selects a starting word recognition engine for use in starting word recognition, and determine a starting word recognition result of the selected starter word recognition engine, as the final starting word recognition result.

According to an embodiment of the present disclosure, the above-described method may be implemented with codes readable by a computer on a medium in which a program is recorded. The computer-readable medium includes all kinds of recording devices in which data readable by a computer system is stored. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like.

The invention claimed is:

1. A display device for adjusting a recognition sensitivity of a speech recognition starting word, display device comprising:
  a display;
  a microphone;
  a memory configured to store a default starting word recognition engine that recognizes a speech recognition starting word; and
  a processor configured to:
    determine a valid recognition threshold range of the default starting word recognition engine,
    sequentially assign recognition thresholds within the valid recognition threshold range to a predetermined number of sensitivity levels, respectively,
    display a sensitivity setting interface including the sensitivity levels through the display, and
    set a default recognition threshold of the default starting word recognition engine to a recognition threshold corresponding to the selected sensitivity level selected by a user through the sensitivity setting interface,
  wherein the processor is configured to obtain first recognition thresholds that equally divide the valid recognition threshold range by the predetermined number of sensitivity levels, sequentially assign the obtained first recognition thresholds to the sensitivity levels, respectively, and to assign the default recognition threshold to one of the sensitivity levels and when the default recognition threshold is not included in the first recognition thresholds, assign the default recognition threshold to a sensitivity level to which one of the first recognition thresholds closest to the default recognition threshold has been assigned among the sensitivity levels.

2. The display device of claim 1, wherein the processor is configured to provide a starting word recognition test interface through the display, and provide a starting word recognition test for the default starting word recognition engine for which a recognition threshold is set through the starting word recognition test interface.

3. The display device of claim 1, wherein the processor is configured to calibrate the first recognition thresholds according to a predetermined unit of recognition thresholds to generate second recognition thresholds, and sequentially assign the generated second recognition thresholds to the sensitivity levels, respectively.

4. The display device of claim 1, wherein the processor is configured to determine, as the valid recognition threshold range, a recognition threshold range in which an amount of change in a false acceptance rate (FAR) or a false rejection rate (FRR) of the default starting word recognition engine with respect to an amount of change in a recognition threshold of the default starting word recognition engine is greater than a predetermined value.

5. The display device of claim 1, wherein the processor is configured to determine, as the valid recognition threshold range, a recognition threshold range in which a false acceptance rate (FAR) or a false rejection rate (FRR) of the default starting word recognition engine has a predetermined range.

6. The display device of claim 1, wherein the processor is configured to obtain speech data including a voice to be registered, and generate a starting word recognition engine corresponding to the voice to be registered using the obtained speech data.

7. The display device of claim 6, wherein the processor is configured to re-train the default starting word recognition engine using the obtained speech data to generate a starting word recognition engine corresponding to the voice to be registered.

8. The display device of claim 6, wherein the processor is configured to set a recognition threshold for a starting word recognition engine corresponding to a registered voice based on an input through the sensitivity setting interface.

9. The display device of claim 8, wherein the processor is configured to perform settings for starting word recognition engines for which a recognition threshold is not set, among the starting word recognition engines corresponding to the registered voices, such that the recognition threshold is set to a recognition threshold set in the default starting word recognition engine or the default recognition threshold.

10. The display device of claim 6, wherein the processor is configured to generate a starting word recognition result for speech data using each starting word recognition engine, determine whether the voice of the speech data is a registered voice based on voice characteristics of the speech data, when the voice is the registered voice, determine a starting word recognition result of a starting word recognition engine corresponding to the registered voice as a final starting word recognition result, and when the voice is not the registered voice, determine a starting word recognition result of the default starting word recognition engine as the final starting word recognition result.

11. The display device of claim 10, wherein the processor is configured to determine whether the voice is the registered voice based on at least one of voiceprint analysis, frequency analysis, or waveform analysis.

12. An operation method of a display device which adjusts a recognition sensitivity of a speech recognition starting word, comprising:

determining a valid recognition threshold range of a default starting word recognition engine;

obtaining first recognition thresholds that equally divide the valid recognition threshold range by the predetermined number of sensitivity levels, sequentially;

sequentially assigning the obtained first recognition thresholds within the valid recognition threshold range to the predetermined number of sensitivity levels, respectively;

assigning the default recognition threshold to one of the sensitivity levels and when the default recognition threshold is not included in the first recognition thresholds, assign the default recognition threshold to a sensitivity level to which one of the first recognition thresholds closest to the default recognition threshold has been assigned among the sensitivity levels;

displaying a sensitivity setting interface including the sensitivity levels through a display; and setting a recognition threshold of the default starting word recognition engine to a recognition threshold value corresponding to the selected sensitivity level selected by a user through the sensitivity setting interface.

13. A non-transitory computer-readable medium storing an operation method of a display device which adjusts a recognition sensitivity of a speech recognition starting word, comprising:

determining a valid recognition threshold range of a default starting word recognition engine;

obtaining first recognition thresholds that equally divide the valid recognition threshold range by the predetermined number of sensitivity levels, sequentially;

sequentially assigning the obtained first recognition thresholds within the valid recognition threshold range to the predetermined number of sensitivity levels, respectively;

assigning the default recognition threshold to one of the sensitivity levels and when the default recognition threshold is not included in the first recognition thresholds, assign the default recognition threshold to a sensitivity level to which one of the first recognition thresholds closest to the default recognition threshold has been assigned among the sensitivity levels;

displaying a sensitivity setting interface including the sensitivity levels through the display; and setting a recognition threshold of the default starting word recognition engine to a recognition threshold value corresponding to the selected sensitivity level selected by a user through the sensitivity setting interface.

14. The display device of claim 1, wherein the sensitivity setting interface comprises a drop-down list, a value input box, a value selection button, or a slide bar for selecting one sensitivity level from among a plurality of sensitivity levels on the display.

* * * * *